United States Patent
Foss

(10) Patent No.: US 11,156,486 B2
(45) Date of Patent: Oct. 26, 2021

(54) MAGNETIC FLOWMETER WITH IMPROVED PROCESSING

(71) Applicant: Micro Motion Inc., Boulder, CO (US)

(72) Inventor: Scot R. Foss, Eden Prairie, MN (US)

(73) Assignee: Micro Motion, Inc., Boulder, CO (US)

( * ) Notice: Subject to any disclaimer, the term of this patent is extended or adjusted under 35 U.S.C. 154(b) by 133 days.

(21) Appl. No.: 16/570,322

(22) Filed: Sep. 13, 2019

(65) Prior Publication Data

US 2021/0080300 A1 Mar. 18, 2021

(51) Int. Cl.
*G01F 1/60* (2006.01)

(52) U.S. Cl.
CPC ..................... *G01F 1/60* (2013.01)

(58) Field of Classification Search
None
See application file for complete search history.

(56) References Cited

U.S. PATENT DOCUMENTS

| | | | |
|---|---|---|---|
| 5,905,206 A | 5/1999 | Herwig et al. | |
| 6,594,613 B1 | 7/2003 | Ley et al. | |
| 6,752,026 B1 | 6/2004 | Hyde | |
| 6,845,330 B2* | 1/2005 | Okuda | G01F 1/60 702/38 |
| 9,182,258 B2* | 11/2015 | Rovner | G01F 1/58 |
| 9,429,454 B2 | 8/2016 | Gao et al. | |
| 2002/0117009 A1 | 8/2002 | Keech | |
| 2004/0024568 A1 | 2/2004 | Eryurek et al. | |
| 2005/0075803 A1 | 4/2005 | Budmiger et al. | |
| 2012/0130681 A1* | 5/2012 | Pride | G01R 22/066 702/189 |
| 2013/0006544 A1 | 1/2013 | Rovner | |
| 2017/0089743 A1* | 3/2017 | Machuca | G01F 1/60 |

OTHER PUBLICATIONS

International Search Report and Written Opinion for International Patent Application No. PCT/US2020/049877, dated Dec. 15, 2020, 14 pages.

(Continued)

*Primary Examiner* — Harshad R Patel
(74) *Attorney, Agent, or Firm* — Christopher R. Christenson; Kelly, Holt & Christenson PLLC

(57) ABSTRACT

The magnetic flowmeter includes at least one coil and a pair of electrodes is configured to detect an electromotive force within the process fluid flow in response to the magnetic field. Measurement circuitry is coupled to the electrodes and is configured to provide an indication of the detected electromotive force. A processor is coupled to the measurement circuitry and is configured to receive the indication of the detected electromotive force. The processor is configured to obtain a sequence of indications of detected electromotive force over a time interval and to generate a plurality of sets of emf samples by selecting non-continuous indications of the detected electromotive force. Each of the sets of emf samples is processed by a signal processing engine to provide an emf sample output. The processor is configured to combine emf sample outputs from each set of emf samples to generate a process fluid flow output.

21 Claims, 11 Drawing Sheets

(56) References Cited

OTHER PUBLICATIONS

International Search Report and Written Opinion for International Patent Application No. PCT/US2020/049432, dated Dec. 17, 2020, 9 pages.
International Search Report and Written Opinion for International Patent Application No. PCT/US2020/049159, dated Dec. 8, 2020, 10 pages.
"High Process Noise Field Guide" retrieved from https://www.emerson.com/documents/automation/white-paper-high-process-noise-field-guide-rosemount-en-89368.pdf, Emerson Process Management. 2012, 4 pages.
U.S. Appl. No. 16/570,328, filed Sep. 13, 2019, Application and Drawings, 18 pages.
U.S. Appl. No. 16/570,301, filed Sep. 13, 2019, Application and Drawings, 19 pages.

* cited by examiner

MAGNETIC FLOWMETER WITH IMPROVED PROCESSING

BACKGROUND

Magnetic flowmeters (or magmeters) measure flow by application of Faraday's Law, an electromagnetic effect. The magnetic flowmeter energizes one or more coils by passing an excitation current through field windings which generate a magnetic field across an electrically isolated, conductive process fluid flow. An electromotive force (EMF) is generated by the flowing process fluid crossing through the magnetic field. This induced voltage (potential) both across the fluid and with respect to the rest of the process fluid can readily be measured by one or more conductive electrodes that contact the flowing process fluid. The volumetric flow is proportional to the flow velocity and the cross-sectional area of the flowtube. The flow velocity is directly proportional to the electrode voltage potential (EV), which is directly proportional to the induced magnetic field strength (B). The induced magnetic field strength is assumed to be proportional to the applied magnetic field (H), which is directly linked to the magnitude of the excitation current. Thus, a direct correlation is provided between the measured electrode voltage potential and indicated volumetric flow.

Magnetic flowmeters are useful in a variety of conductive and semi-conductive fluid flow measurement environments. In particular, the flow of water-based fluids, ionic solutions and other conducting fluids can all be measured using magnetic flowmeters. Further, magnetic flowmeters are often used with fluids that may contain solids, such as pulp used in paper processing. Thus, magnetic flowmeters can be found in water treatment facilities, beverage and hygienic food production, chemical processing, high purity pharmaceutical manufacturing, as well as hazardous and corrosive fluid processing facilities. However, some environments are more susceptible to signal noise. Providing an magnetic flowmeter with a better response to signal noise would improve the accuracy of the flow output when used in such noisy environments.

SUMMARY

A magnetic flowmeter includes at least one coil configured to generate a magnetic field within a process fluid flow. A pair of electrodes is configured to detect an electromotive force within the process fluid flow in response to the magnetic field. Measurement circuitry is operably coupled to the pair of electrodes and is configured to provide an indication of the detected electromotive force. A processor is coupled to the measurement circuitry and configured to receive the indication of the detected electromotive force. The processor is configured to obtain a sequence of indications of detected electromotive force over a time interval and to generate a plurality of sets of emf samples by selecting non-contiguous indications of the detected electromotive force. Each of the plurality of sets of emf samples is processed by a signal processing engine to provide an emf sample output. The processor is configured to combine emf sample outputs from each set of emf samples to generate a process fluid flow output. In another aspect, the processor is configured to obtain the sequence of indications of detected electromotive force over a timer interval and generate a plurality of data streams from the sequence of indications of detected electromotive force. The processor is further configured to perform signal processing on each stream to generate a plurality of stream outputs and to generate a process flow output based on a combination of the plurality of data stream outputs. In a further aspect, the processor is configured to calculate median absolute deviation of each data stream to provide each data stream output.

DETAILED DESCRIPTION OF ILLUSTRATIVE EMBODIMENTS

Figure 1:
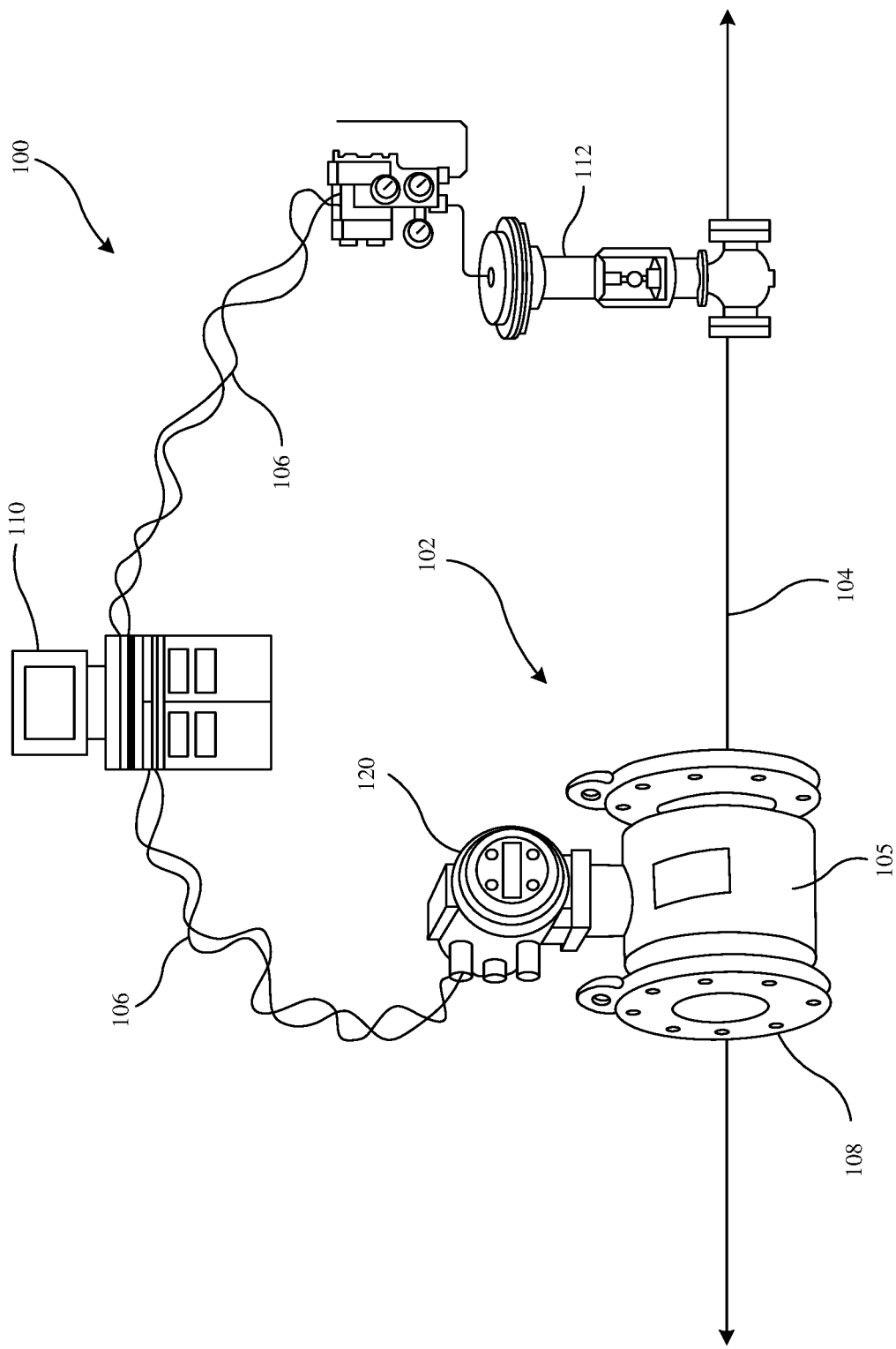
FIG. 1 is a diagrammatic view of an environment in which magnetic flowmeters in accordance with embodiments of the present invention are useful.

FIG. 1 illustrates a typical environment 100 for magnetic flowmeter 102. Magnetic flowmeter 102 is coupled to process piping, illustrated diagrammatically at line 104 that also couples to control valve 112. Magnetic flowmeter 102 is configured to provide a flow rate output relative to process fluid flow through piping 104 in a process. Examples of such fluids include slurries and liquids in chemical, pulp, pharmaceutical and other fluid processing plants.

Magnetic flowmeter 102 includes electronics housing 120 connected to flowtube 108. Magnetic flowmeter 102 outputs are configured for transmission over relatively long distances to a controller or indicator via process communication connection 106. In typical processing plants, communication connection 106 can employ a digital communication protocol, an analog communication signal, or a combination thereof. The same or additional process information can be made available via wireless communication, pulse width or frequency output, or discrete input/outputs (DI/DO). System controller 110 can display flow information for a human operator as well as provide control signals over process communication connection 106 in order to control the process using control valves, such as valve 112.

Figure 2:
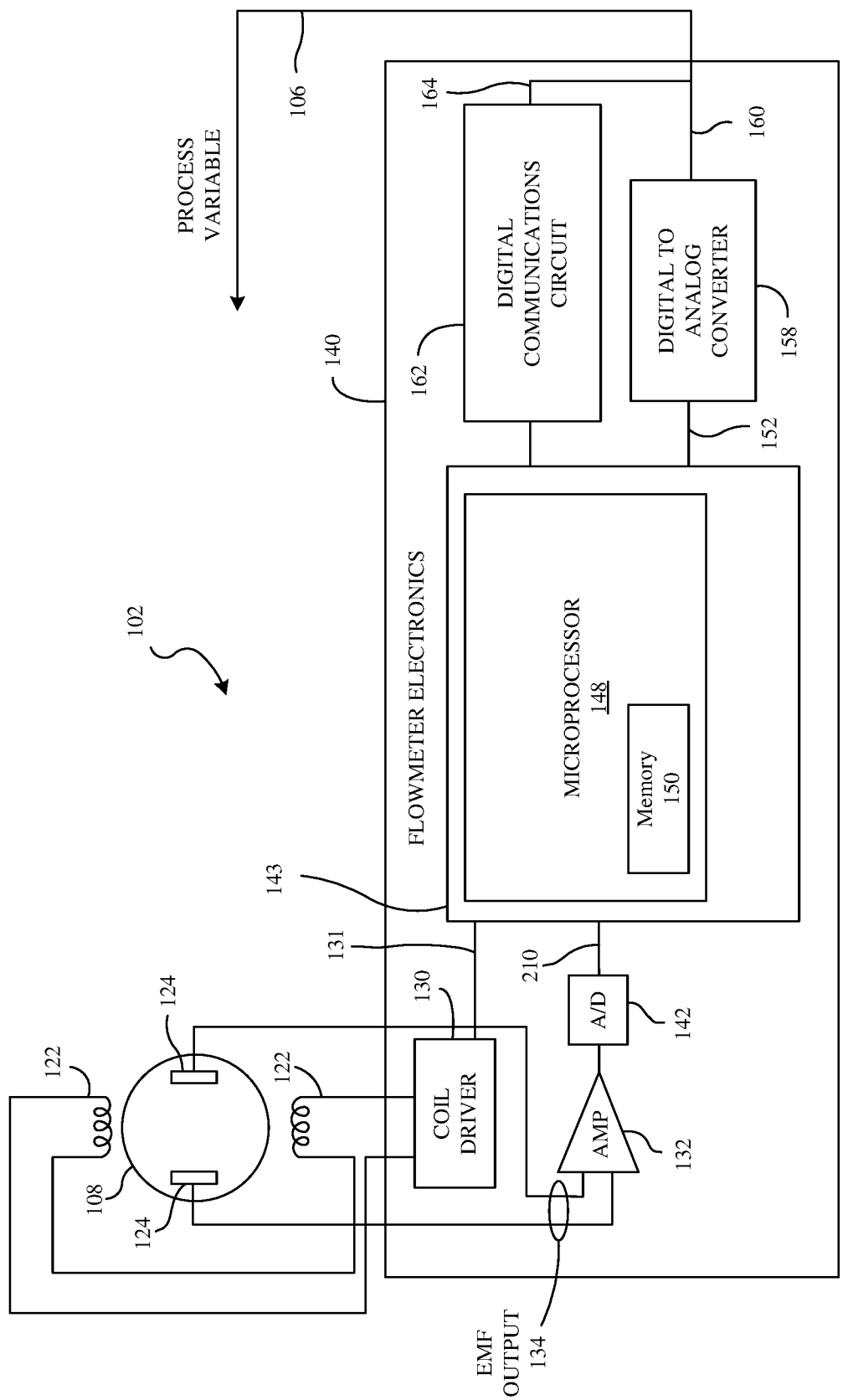
FIG. 2 is a block diagram of a magnetic flowmeter in accordance with an embodiment of the present invention.

FIG. 2 is a block diagram of magnetic flowmeter 102 with which embodiments of the present invention are particularly applicable. Magnetic flowmeter 102 measures a flow of conductive process fluid through flowtube assembly 108.

Coils 122 are configured to apply an external magnetic field in the fluid flow in response to an applied excitation current from coil driver 130. EMF sensors (electrodes) 124 electrically couple to the fluid flow and provide an EMF signal output 134 to amplifier 132 related to an EMF generated in the fluid flow due to the applied magnetic field, fluid velocity, and noise. Analog-to-digital converter 142 provides a digitized EMF signal to microprocessor system 148 of flowmeter electronics 143.

Microprocessor 148 may be configured, through hardware, software, or a combination thereof, to provide digital signal processing functions relative to EMF output 134 in order to provide an output 152 related to fluid velocity. Further, as will be described in greater detail below, the signal processing can provide improved noise rejection. Microprocessor 148 may include or be coupled to memory 150 that contains instructions that, when executed by microprocessor 148, provide process fluid flow velocity output calculation as well as improved noise reduction in accordance with embodiments described herein.

Microprocessor 148 calculates fluid flow velocity through flowtube 108 in accordance with a relationship between the EMF output 134 and flow velocity as described in an application of Faraday's Law:

$$V = \frac{E}{kBD}$$

Where E can be the signal output 152 which is related to the EMF output 134, V is the velocity of the fluid, D is the diameter of flowtube 108, B is the strength of the induced magnetic field in the process fluid, and k is a constant of proportionality. Microprocessor 148 uses velocity and the measured magnetic field or coil current to calculate flow of the process fluid in accordance with known techniques. A digital-to-analog converter 158 is coupled to microprocessor 148 of flowmeter electronics 143 and generates an analog transmitter output 160 for coupling to communication bus 106. A digital communication circuit 162 may generate a digital transmitter output 164. The analog output 160 and/or digital output 164 can be coupled to process controllers or monitors, as desired.

Magnetic flowmeters are often employed in applications having a significant level of solids since the flowmeter does not require any sort of flow obstruction to provide its measurement. When such solids impact the measurement electrodes of the magnetic flowmeter, they can generate large amounts of electrical noise. This noise distorts the measurement waveform and results in significant error on the flow output. In extreme situations, the errors can be as large as 100% of the actual flow value. Additionally, as modern designs comply with approval restrictions for reduced coil drive currents, these problems are exacerbated.

It has been determined that much of the noise that the magnetic flowmeter experiences is relatively non-linear. Typically, there will be significant spikes in the raw flow measurements EMF measured across electrodes 124 by A/D converter 142 that can be many times the actual flow value. Since the noise spikes are not symmetric around an average value, a damping filter will not properly filter them.

Figure 3A:
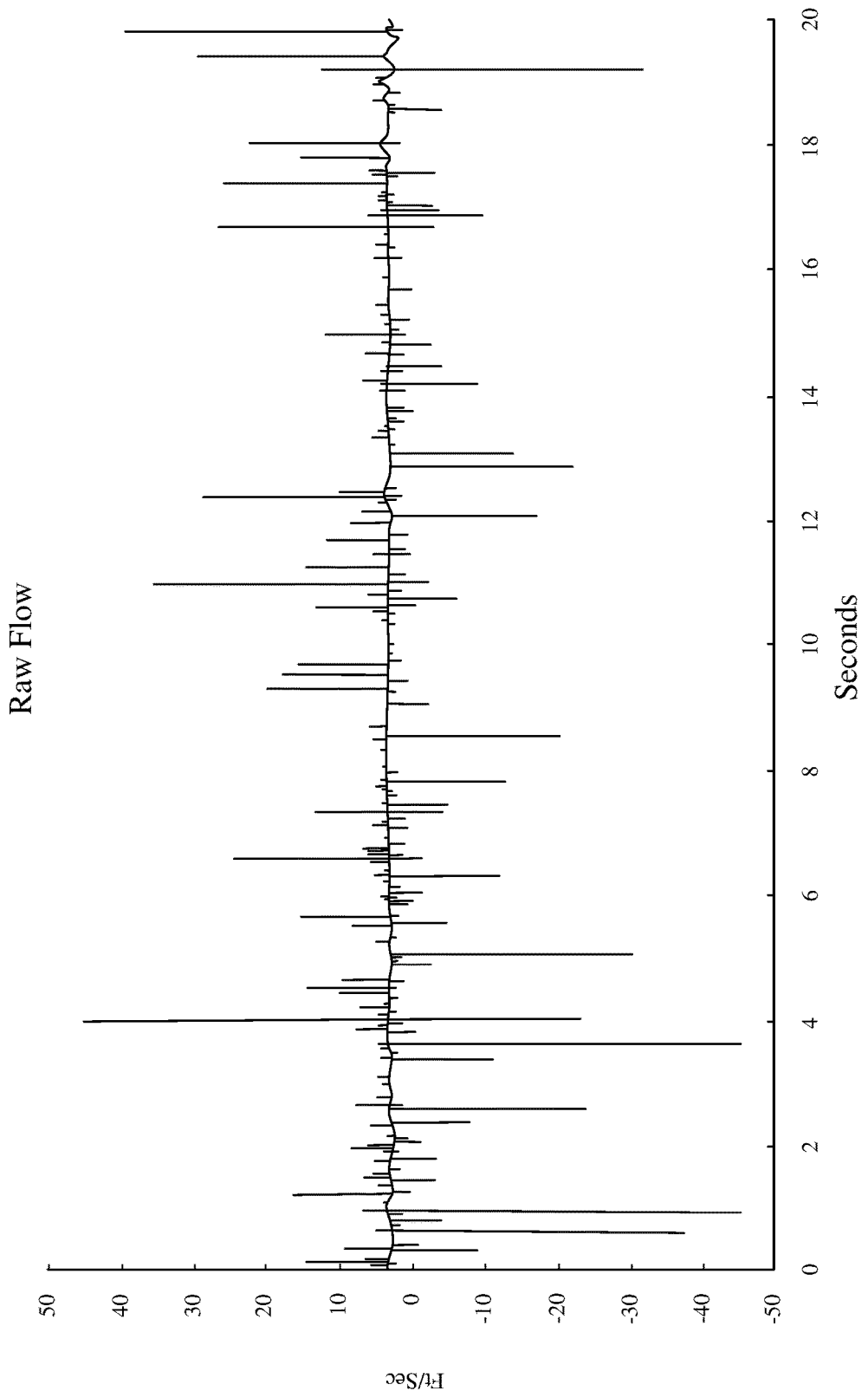
FIGS. 3A and 3B are graphs illustrating noise experienced by a magnetic flow meter with a simulated flow.
Figure 3B:
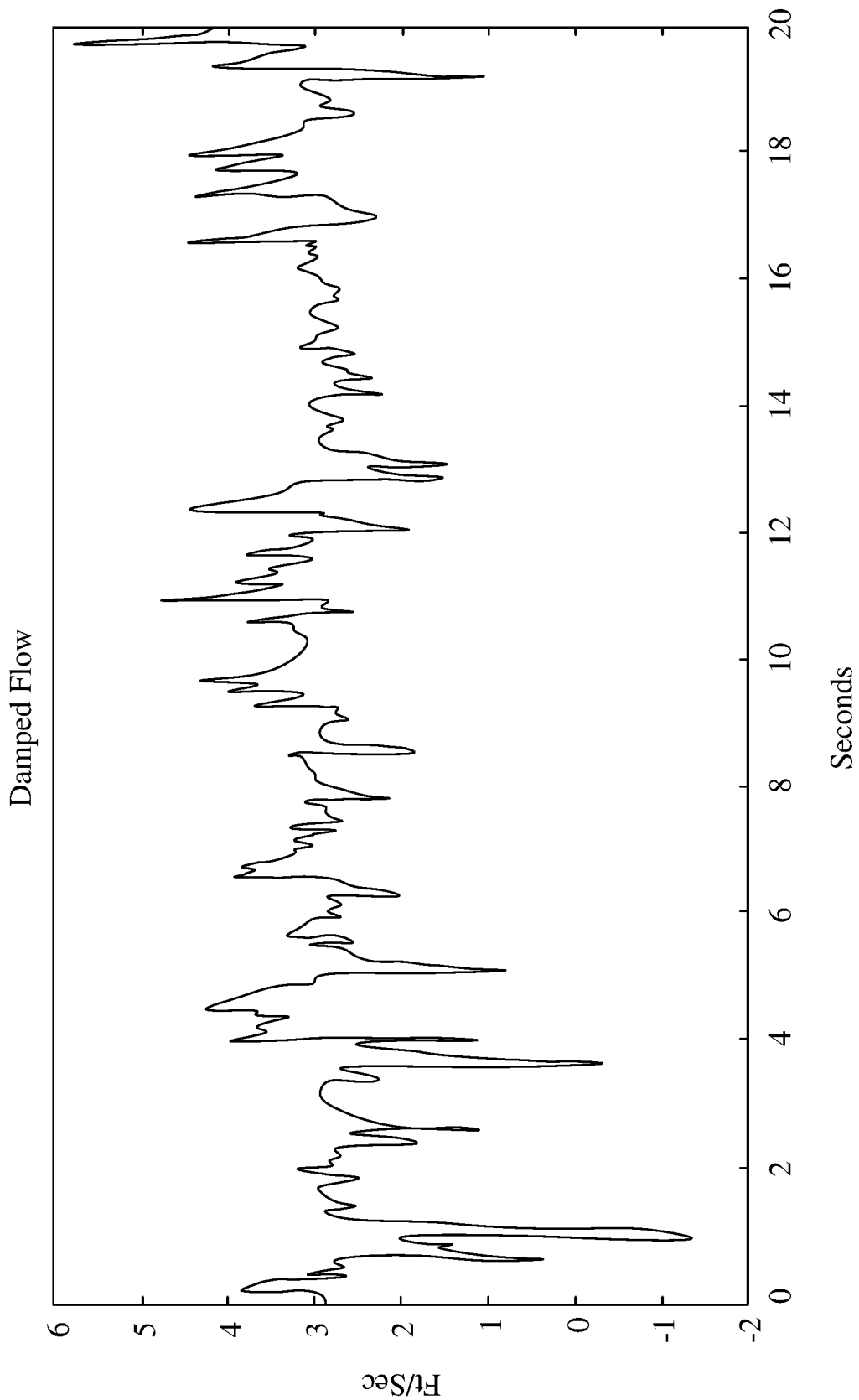

FIGS. 3A and 3B are graphs illustrating noise experienced by a magnetic flowmeter with a simulated flow fixed at 3 feet/second. FIG. 3A shows a significant negative spike followed by a significant positive spike slightly around 4 seconds. The negative spike exceeds −40 ft/sec while the positive spike exceeds +40 ft/sec. The corresponding damped flow output shown in FIG. 3B shows a significant distortion in the damped flow value at about 4 seconds.

In accordance with embodiments of the present invention, a new signal processing technique for magnetic flow meters is provided. This signal processing can be performed within the microprocessor of the magnetic flowmeter, or in any suitable logic or circuitry coupled to the microprocessor. In general, the raw flow stream of data (individual EMF measurements across the electrodes at the maximum sampling rate) is used to create separate data streams that are randomly or at least non-sequentially mixed over a fixed period of time. When the flow data is mixed in time, it will separate each sample from its temporal neighbor. Such temporal separation facilitates more effective identification of spikes so that they can be properly rejected. The data streams are then recombined in order to provide an overall average that will help minimize the flow errors.

Figure 4:
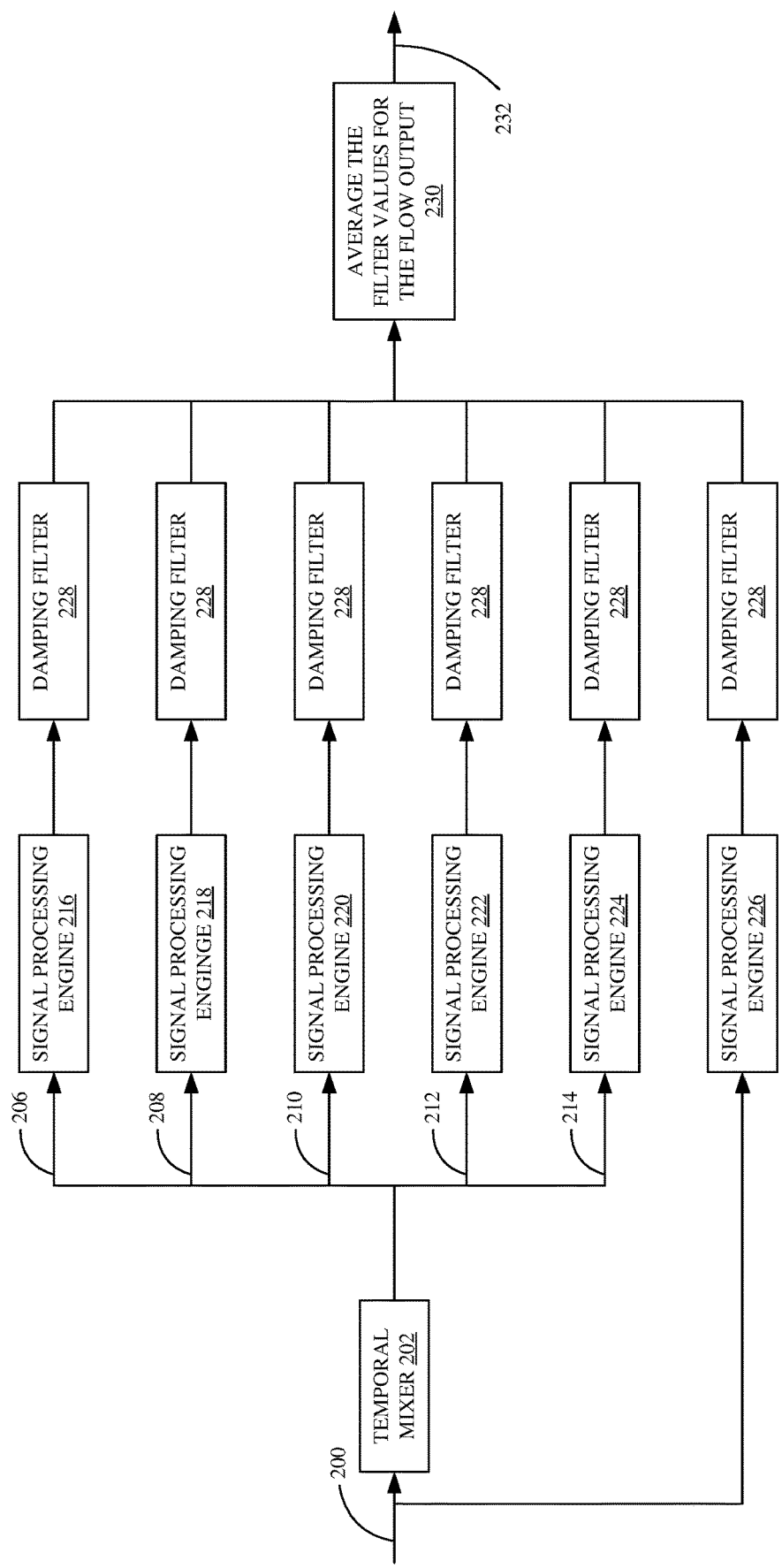
FIG. 4 is a block diagram of improved magnetic flowmeter signal processing in accordance with an embodiment of the present invention.

FIG. 4 is a block diagram of improved magnetic flowmeter signal processing in accordance with an embodiment of the present invention. As can be seen, raw flow measurements (indicated at reference numeral 200) are provided to temporal mixer 202 and also to signal processing engine 226. Temporal mixer 202 buffers the samples over a certain scan period (e.g., 0.250 seconds) and when the buffer is full, temporal mixer 202 creates a plurality of data streams of flow data. In one example, temporal mixer 202 creates five different streams of flow data where each stream is randomly organized. For example, if there are 100 samples taken during the 0.25 seconds, then each stream will see all samples but in a different order than the other streams due to temporal mixing. Those skilled in the art will also appreciate that embodiments of the present invention can be practiced with non-random techniques where buffer location selection ensures that non-consecutive or contiguous locations are used. However, in a preferred embodiment, random buffer locations are employed.

As shown in FIG. 4, temporal mixer 202 outputs a plurality of new flow streams 206, 208, 210, 212, and 214. Each of these flow streams is provided as an input to a respective signal processing engine 216, 218, 220, 222, and 224. Each respective signal processing engine is used to categorize the raw flow samples provided by temporal mixer 202 and provide a moving average value. Each signal processing engine evaluates the flow samples based on limits around the moving average that are constantly updated.

In one embodiment, these limits are constantly updated based on a median absolute deviation (MAD). MAD is a mathematically known calculation that is robust against outliers. MAD is generally believed to be more resistant to outliers in a data set than standard deviation. While in standard deviation, the distances from the mean are squared, in median absolute deviation, the deviations of a small number of outliers are irrelevant. MAD is calculated by first computing a median for a group of samples. Then the deviation of each sample from the median is calculated. Finally, the median of the sample deviations is calculated to provide the MAD. As an example, consider the data (2, 2, 4, 4, 8, 12, 18). It has a median value of 4. The absolute deviations about 4 are (2, 2, 0, 0, 4, 8, 14) which in turn have a median value of 2 (because the sorted absolute deviations are (0, 0, 2, 2, 4, 8, 14)). So, the median absolute deviation for this data is 2.

The MAD is used to dynamically measure the amount of noise in the flow and adjust the limits accordingly. As set forth above, the MAD is similar to standard deviation but it is superior at dealing with non-linear noise spikes. Each signal processing engine 216, 218, 220, 222, and 224 provides its output to a respective damping filter that may average successive outputs from individual signal processing engines to provide a temporally damped output. The damping can also include any other suitable techniques or calculations. For example, one or all of the damping filters may include a low pass filter.

While FIG. 4 illustrates each of signal processing engines 216, 218, 220, 222, and 224 providing their outputs to respective individual damping filters, it is also expressly contemplated that the outputs from the signal processing engines could be averaged together and that average could then be fed to a signal damping filter. Further still, while the signal processing settings for each of the signal processing engines can all be the same, they could also be different, if desired. Different signal processing settings would minimize the effect of having sub-optimal signal processing settings. Additionally, it is noted that the values from each flow stream of respective signal processing engines could be sorted and the middle values in the streams could be used. This would further reject a stream that has reacted poorly to noise. As can be seen in FIG. 4, the outputs of the various damping filters are eventually fed to block 230 which averages the filter values for the flow output and provides an improved flow output value 232. Alternatively, the outputs from the various damping filters could be combined in a different manner rather than simple averaging them together. Certain statistical measurements, such as standard deviation, peak to peak range, and/or interquartile range, could be used to either reject the weaker signal processing engines or give more weight to the stronger signal processing engines.

Figure 5:
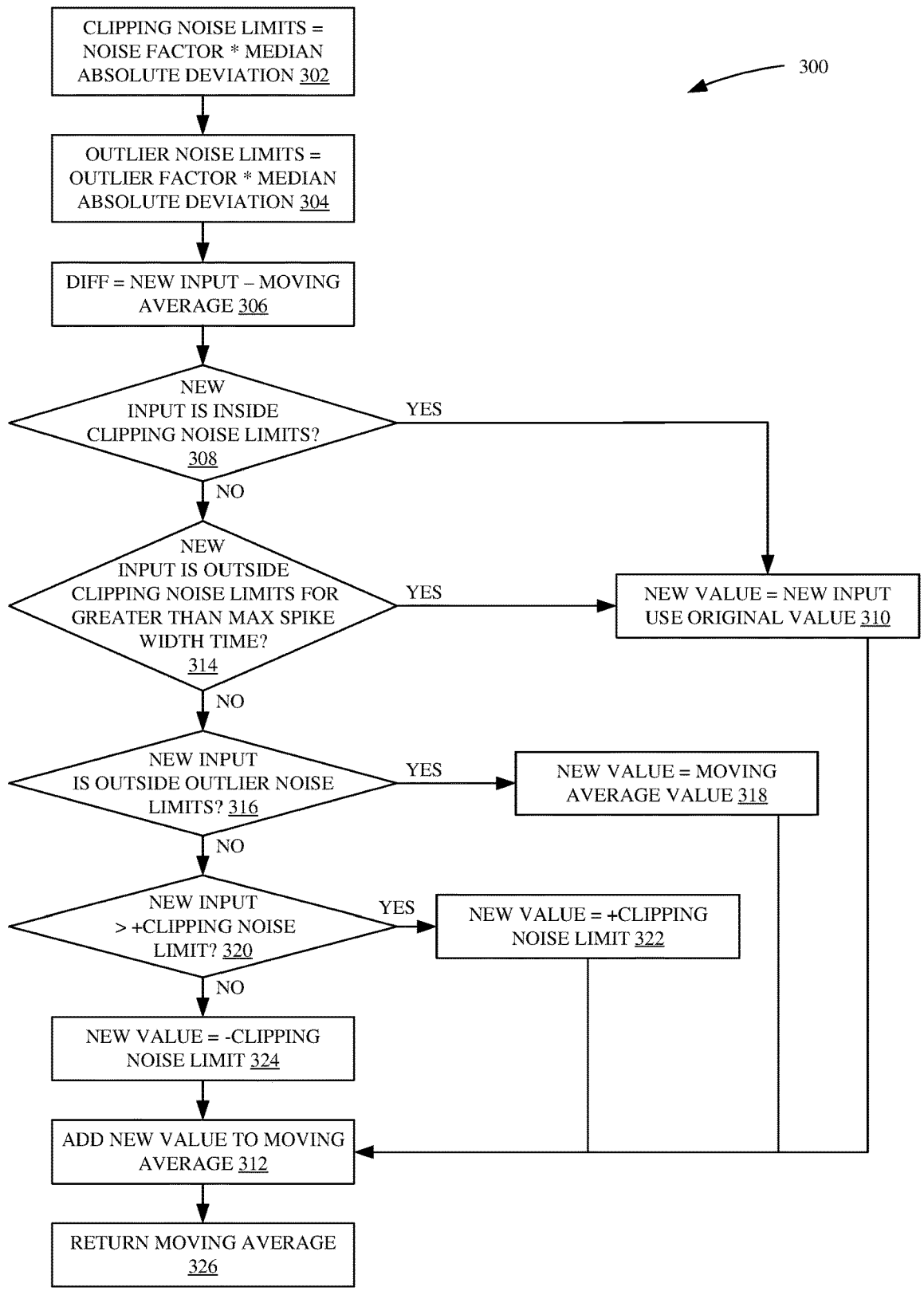
FIG. 5 is a flow diagram of a method of processing raw flow data in a magnetic flowmeter in accordance with an embodiment of the present invention.

FIG. 5 is a flow diagram of a method of processing raw flow data in a magnetic flowmeter in accordance with an embodiment of the present invention. Method 300 begins at block 302 where a value labeled Clipping Noise Limits is set equal to a noise factor multiplied by median absolute deviation (MAD). At block 304, the quantity "outlier noise limits" is set equal to an outlier factor multiplied by the median absolute deviation. Next, at block 306, a difference value is generated by subtracting a moving average from a new input. At block 308, it is determined whether the new input is within the Clipping Noise Limits set in block 302. If so, control passes to block 310, where the new value is set equal to the new input and the original value is used. Then, control passes down to block 312 where the new value is added to the moving average. If, however, at block 308, the new input is not inside the Clipping Noise Limits, then control passes to block 314 where it is determined whether the new input is outside Clipping Noise Limits for a time period greater than a Max Spike Width Time. This Max Spike Width Time can be set by the manufacturer or may be a user-selectable setting in the magnetic flowmeter. Regardless, if the new input is outside the Clipping Noise Limits for greater than the Max Spike Width Time, then control passes again, to block 310 where the new value is set equal to the new input and the original value is used with control passing to block 312.

If, at block 314, the new input is not outside the Clipping Noise Limits for greater than the Max Spike Width Time, the control passes to block 316 where it is determined whether the new input is outside the Outlier Noise Limits. If so, control passes to block 318 where the new value is set equal to the moving average value, and control passes to block 312. If, however, at block 316 it is determined that the new input is not outside the Outlier Noise Limits, then control passes to block 320 where it is determined whether the new input is greater than the Clipping Noise Limit. If so, control passes to block 322 where the new value is set equal to the Clipping Noise Limit and control passes to block 312. However, if at block 320, it is determined that the new input is not greater than the Clipping Noise Limit, then control passes to block 324 where the new input is set equal to the negative Clipping Noise Limit and control passes to block 312. At block 312, as described above, the new value is added to the moving average, and subsequently, at block 326, the moving average is returned.

The method described with respect to FIG. 5 can be summarized as follows. If a new sample is within Clipping Noise Limits, then the sample may be used as is. However, if the new sample is outside of the Clipping Noise Limits but inside the Outlier Limits, then the sample is clipped at the Clipping Noise Limit. If the sample is outside of the Outlier Limits, then the moving average is used. While the clipping described with respect to FIG. 5 is viewed as hard clipping, it is also contemplated that soft clipping could be used that would reduce the gain as the samples are farther away from the moving average. Another alternative is to automatically adjust the limits to keep a certain number of samples.

Figure 6:
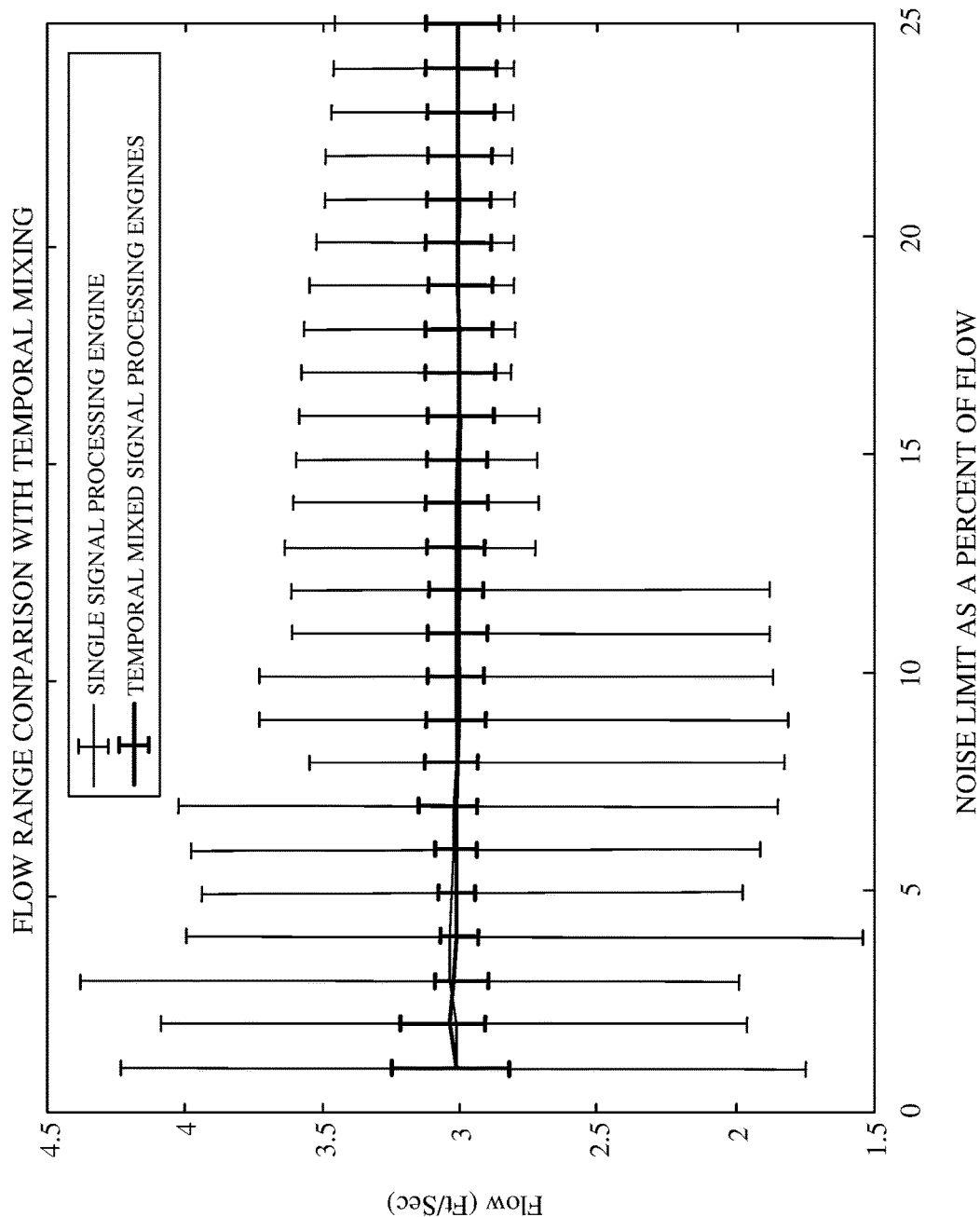
FIG. 6 is a graph illustrating noise limit as a percentage of flow comparing the output of a single signal processing engine with that of temporally mixed signal processing engines in accordance with an embodiment of the present invention.

FIG. 6 is a graph illustrating noise limit as a percentage of flow comparing the output of a single signal processing engine with that of temporally mixed signal processing engines in accordance with an embodiment of the present invention. As shown in FIG. 6, the flow is still set at 3 feet/second. The vertical bars illustrate variability of the flow versus the noise limit setting as a percentage of the flow. Thus, it can be seen that using temporal mixing for multiple signal processing engines provides a vastly reduced noise signal which thus provides a significant increase in noise rejection for the overall flow output.

Figure 7:
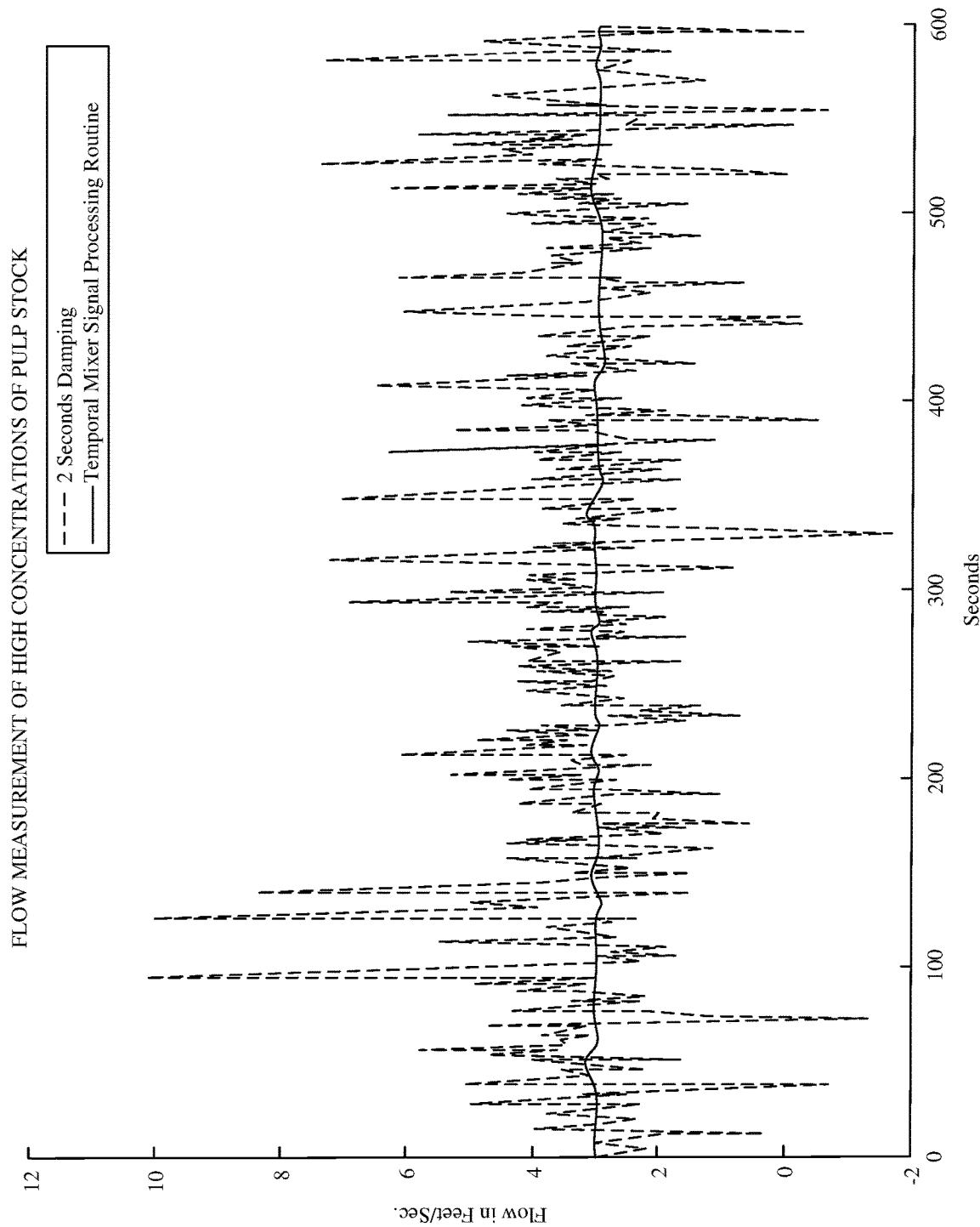
FIG. 7 is a graph illustrating improvement of a signal processing engine with noise from a 10% pulp stock.

FIG. 7 is a graph illustrating improvement of a signal processing engine with noise from a 10% pulp stock. The dashed line illustrates flow measurement with a simple 2 second damping technique, while the solid line illustrates flow measurement using the temporal mixer signal processing routine. The standard deviation and peak to peak range with signal processing are respectively 18.5 and 36.3 times smaller than a straight damping filter. In FIG. 7, the flow of the 10% pulp stock is still set at 3 feet/second. Pulp stock is an example of a flow medium having significant solid content which can generate noise when such solids impact the electrodes. As can be seen, at time approximately 100 seconds, a spike in the 2 second damping flow signal exceeds 10 feet/second. In contrast, the temporal mixed signal processing routine remains at 3 feet/second. This is a significant improvement in signal processing for the flowmeter in such high solid processing environments.

Figure 8:
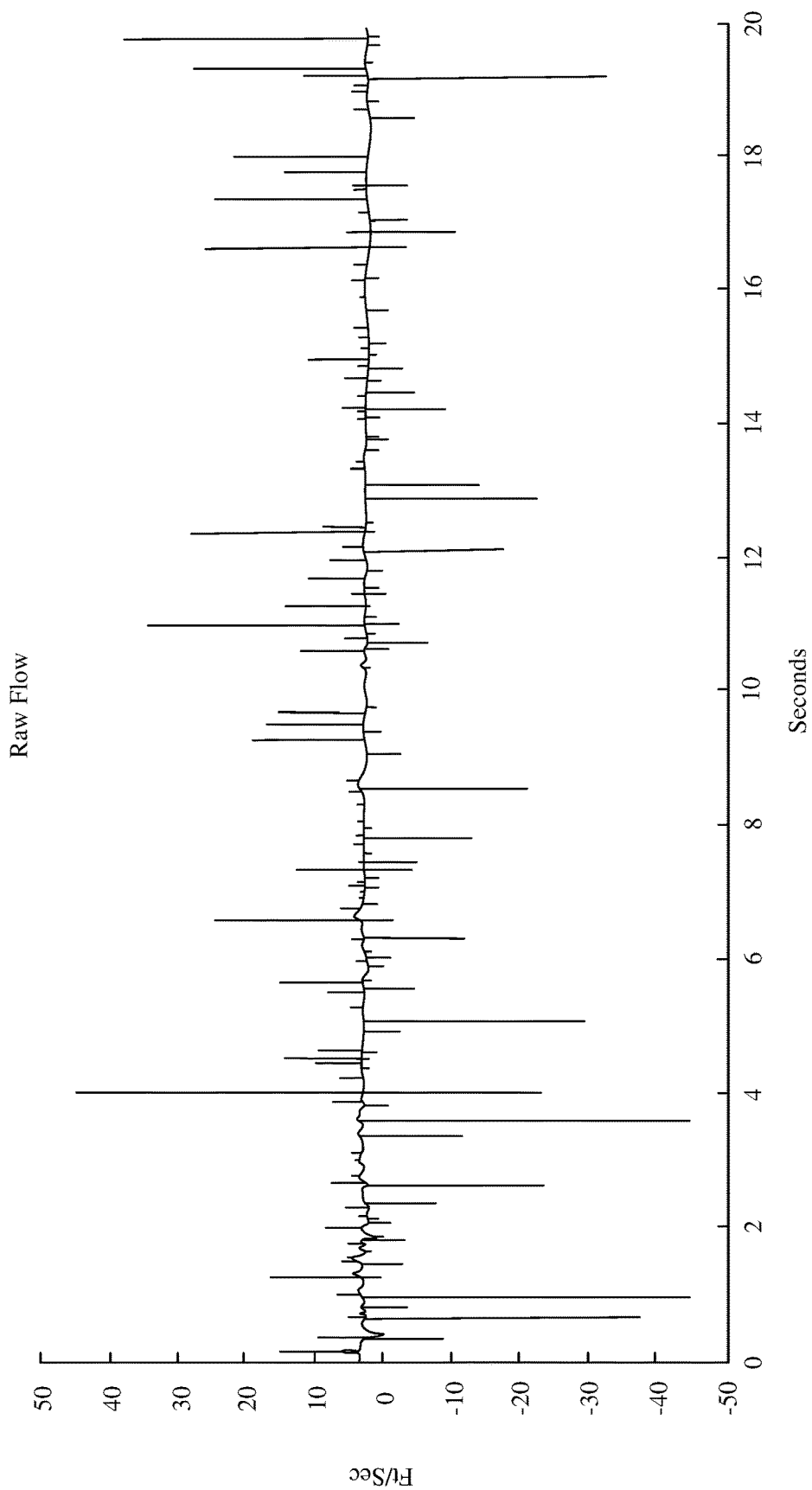
FIG. 8 is a graph illustrating raw flow seen in a typical magnetic flowmeter installation.
Figure 9:
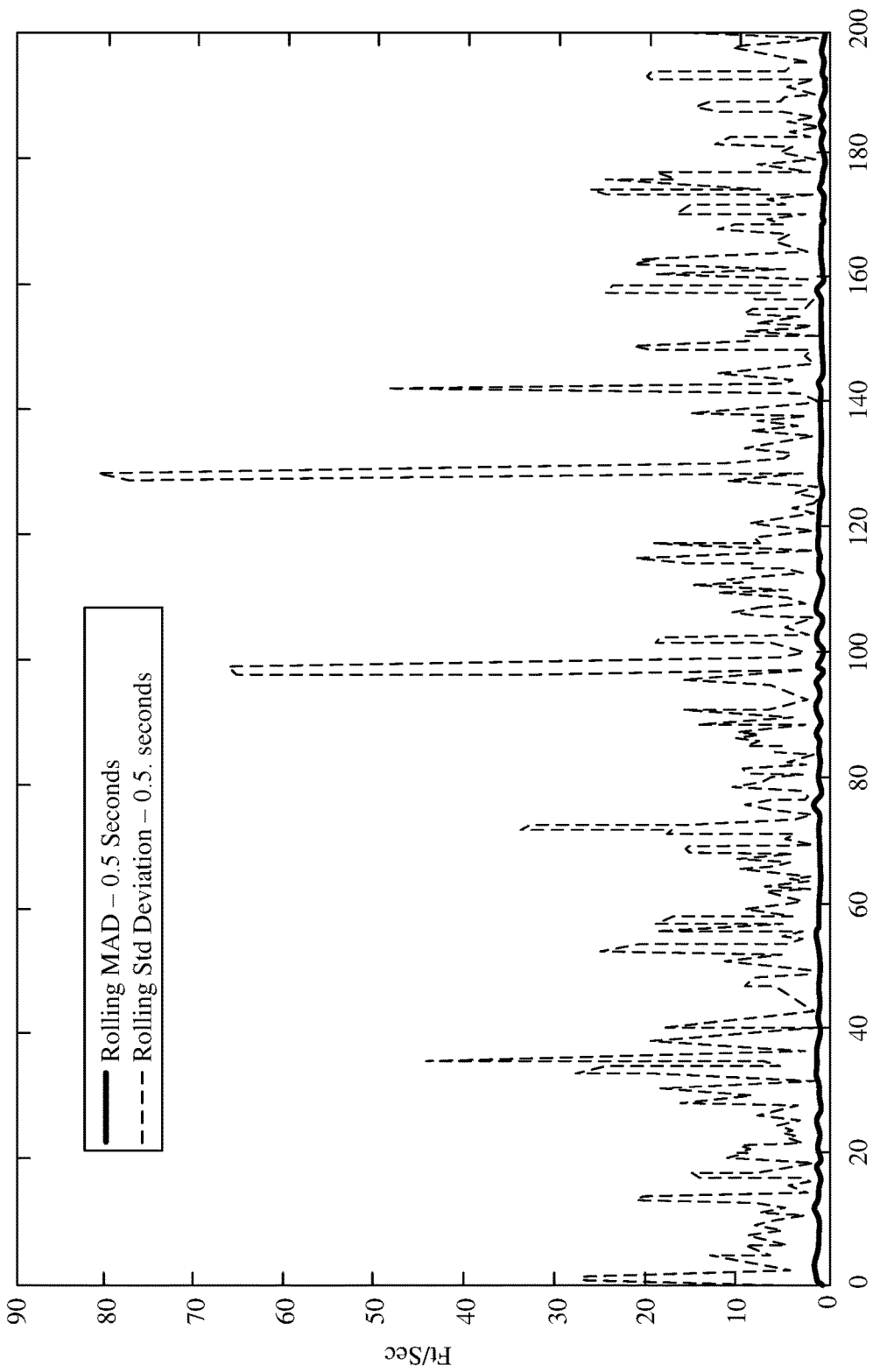
FIG. 9 is a comparison of rolling MAD (with a 0.5 second window) to rolling standard deviation with the same time second window.

FIG. 8 is a graph illustrating raw flow seen in a typical magnetic flowmeter installation. FIG. 9 is a comparison of rolling MAD (with a 0.5 second window) to rolling standard deviation with the same time second window for the raw flow values shown in FIG. 8. The comparison of the rolling MAD and the standard deviation shows that the MAD is much more stable than the standard deviation for magnetic flowmeter signal processing. With normally distributed noise, the standard deviation should be approximately 1.4826 times larger than the MAD. The average of the standard deviation in FIG. 9 is 10.7 times larger with a peak to peak range of approximately 80.05 feet/second. A range of the MAD is 2.14 feet/second. The standard deviation is simply inferior in applications where the impingements in the flow stream cause spikes in the flow signal. As can be appreciated, contrasting the two signals shown in FIG. 9 can provide useful information about the nature of the process fluid flow. Thus, in some embodiments the median absolute deviation could also be used to detect when solids or chemicals are present. Further, median absolute deviation could even be used to correlate the amount of solids for a particular process.

Figure 10:
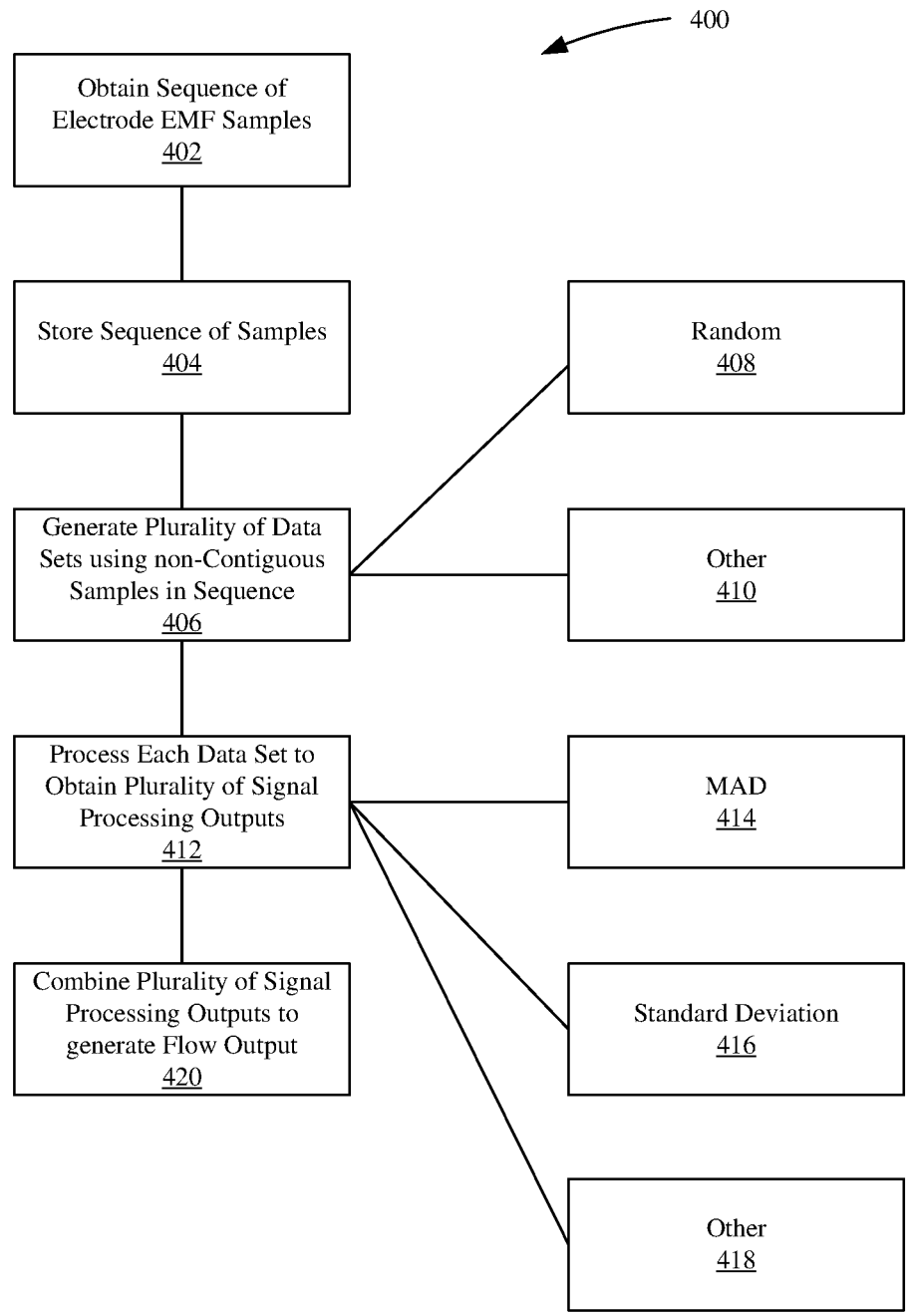
FIG. 10 is a flow diagram of a method of processing electrode EMF samples to provide a flow output in a magnetic flowmeter in accordance with an embodiment of the present invention.

FIG. 10 is a flow diagram of a method of processing electrode EMF samples to provide a flow output in a magnetic flowmeter in accordance with an embodiment of the present invention. Method 400 begins at block 402 where a sequence of EMF samples is obtained from electrodes 124. The sequence may be for a defined time period, such as 0.5 seconds or a variable time period. Next, at block 404, the individual EMF samples are stored. In one embodiment, they are stored in a buffer in a manner that maintains their sequence. At block 406, a plurality of data sets is created from the stored EMF samples where non-contiguous samples are used. In one embodiment, five different data sets are used. However, those skilled in the art will recognize that more or fewer data sets can be used in accordance with embodiments described herein. The manner in which non-contiguous samples are used can be drawing samples from random locations in a buffer, as indicated at reference numeral 408, or in any other suitable manner as indicated at reference numeral 410.

At block 412, each data set is processed to obtain a signal processing output for each data set. The signal processing can employ median absolute deviation, as indicated at reference numeral 414, standard deviation as indicated at reference numeral 416, or other suitable processing as indicated at reference numeral 418. Finally, at block 420, the different outputs from each processed data set are combined to provide a process flow output value. As set forth above, this may be a simple average of the various outputs or may include weights assigned to each data set based on a particular type of processing done on that data set and a statistical aspect or parameter of the emf samples.

While the signal processing described above is generally done independent of a percent of flow, it is also contemplated that the signal processing routine could use a percent of flow to adjust the noise limits. This is because, to some extent, it is believed that the noise will scale with the flow.

Although the present invention has been described with reference to preferred embodiments, workers skilled in the art will recognize that changes may be made in form and detail without departing from the spirit and scope of the invention. For example, as set forth above, median absolute deviation is a preferred technique for embodiments of the present invention. However, it is also expressly contemplated that temporal mixing can be used in combination with standard deviation or other statistical or signal processing techniques.

What is claimed is:

1. A magnetic flowmeter, comprising:
   at least one coil configured to generate a magnetic field within a process fluid flow;
   a pair of electrodes configured to detect an electromotive force within the process fluid flow in response to the magnetic field;
   measurement circuitry operably coupled to the pair of electrodes and configured to provide an indication of the detected electromotive force; and
   a processor coupled to the measurement circuitry and configured to receive the indication of the detected electromotive force, the processor being configured to obtain a sequence of indications of detected electromotive force over a time interval and to generate a plurality of sets of emf samples by employing a temporal mixer to select non-contiguous indications of the detected electromotive force, wherein each of the plurality of sets of emf samples is processed by a signal processing engine to provide an emf sample output, and wherein the processor is configured to combine emf sample outputs from each set of emf samples to generate a process fluid flow output.

2. The magnetic flowmeter of claim 1, wherein the processor is configured to employ the temporal mixer to select non-contiguous indications of the detected electromotive force randomly.

3. The magnetic flowmeter of claim 1, wherein the temporal mixer includes a buffer configured to receive the sequence of detected electromotive force indications.

4. The magnetic flowmeter of claim 3, wherein the temporal mixer is configured to generate each of the plurality of sets of emf samples by selecting contents of a random location in the buffer.

5. The magnetic flowmeter of claim 1, wherein the signal processing engine comprises a plurality of signal processing engines, each being configured to receive a respective set of emf samples.

6. The magnetic flowmeter of claim 5, wherein the plurality of signal processing engines perform identical signal processing on each respective set of emf samples.

7. The magnetic flowmeter of claim 5, wherein the plurality of signal processing engines perform different signal processing on each respective set of emf samples.

8. The magnetic flowmeter of claim 1, wherein the signal processing engine is configured to determine a median absolute deviation of each set of emf samples.

9. The magnetic flowmeter of claim 1, wherein the processor is configured to generate the process fluid flow output based on an average of the emf sample outputs.

10. The magnetic flowmeter of claim 9, wherein the average is a weighted average.

11. The magnetic filter of claim 1, wherein the processor is configured to generate the process fluid flow output using at least one low pass filter on the emf sample outputs.

12. A magnetic flowmeter, comprising:
   at least one coil configured to generate a magnetic field within a process fluid flow;
   a pair of electrodes configured to detect an electromotive force within the process fluid flow in response to the magnetic field;
   measurement circuitry operably coupled to the pair of electrodes and configured to provide an indication of the detected electromotive force; and
   a processor coupled to the measurement circuitry and configured to receive the indication of the detected electromotive force, the processor being configured to obtain a sequence of indications of detected electromotive force over a time interval and to generate a plurality of data streams from the sequence of indications of detected electromotive force and perform signal processing on each data stream to generate a plurality of data stream outputs and to generate a process fluid flow output based on a combination of the plurality of data stream outputs.

13. The magnetic flowmeter of claim 12, wherein the processor is configured to calculate median absolute deviation of each data stream to provide each data stream output.

14. The magnetic flowmeter of claim 12, wherein the processor is further configured to provide an indication of solids in the process fluid flow based, at least in part, on the median absolute deviation.

15. The magnetic flowmeter of claim 14, wherein the indication of solids is an indication of an amount of solids in the process fluid flow.

16. A method of providing a process fluid flow output in a magnetic flowmeter, the method comprising:
   obtaining a series of emf measurements from a pair of electrodes of the magnetic flowmeter;
   randomly assigning emf measurements into a plurality of sets of emf samples;
   processing each set of the plurality of sets of emf samples by computing a median absolute deviation for each set to provide a plurality of emf outputs; and
   combining the plurality of emf outputs to generate a process fluid flow output.

17. The method of claim 16, and further comprising generating an indication of solids in the process fluid flow based, at least in part, on the median absolute deviation of each set.

18. The method of claim 16, and further comprising storing the series of emf measurements in a buffer of a temporal mixer.

19. The method of claim 16, wherein processing each set of the plurality of sets includes applying different signal processing to each set of the plurality of sets of emf samples.

20. The method of claim 16, wherein processing each of the sets of emf samples includes clipping flow samples to reduce noise.

21. The method of claim 20, wherein clipping includes replacing an outlier with a clipped value.

* * * * *